US010147062B2

(12) United States Patent
Rainisto

(10) Patent No.: US 10,147,062 B2
(45) Date of Patent: Dec. 4, 2018

(54) APPARATUS, METHOD, AND COMPUTER PROGRAM PRODUCT FOR DETERMINING CALENDAR ENTRIES TO ADVANCE USER GOALS

(71) Applicant: Nokia Technologies Oy, Espoo (FI)

(72) Inventor: Roope Rainisto, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 642 days.

(21) Appl. No.: 14/328,662

(22) Filed: Jul. 10, 2014

(65) Prior Publication Data

US 2016/0012376 A1 Jan. 14, 2016

(51) Int. Cl.
*G06F 3/00* (2006.01)
*G06Q 10/06* (2012.01)
*G06Q 10/10* (2012.01)

(52) U.S. Cl.
CPC ... *G06Q 10/063114* (2013.01); *G06Q 10/109* (2013.01)

(58) Field of Classification Search
CPC ..... A61B 5/4812; H04L 67/22; H04L 67/306; H04L 67/2804; H04L 67/325; G06Q 10/063114; G06Q 10/109
See application file for complete search history.

(56) References Cited

U.S. PATENT DOCUMENTS

| 6,381,580 | B1 | 4/2002 | Levinson |
| 7,318,040 | B2 | 1/2008 | Doss et al. |
| 8,235,724 | B2 | 8/2012 | Gilley et al. |
| 8,560,371 | B2 | 10/2013 | Levitt |
| 2002/0074792 | A1* | 6/2002 | Newell ............ B42D 5/04 283/2 |
| 2012/0171649 | A1* | 7/2012 | Wander ........... A61B 5/743 434/247 |
| 2012/0310873 | A1 | 12/2012 | Yamazaki et al. |

(Continued)

FOREIGN PATENT DOCUMENTS

| JP | 2007-140653 | 6/2007 |
| JP | 2008-104758 | 5/2008 |

OTHER PUBLICATIONS

International Search Report and Written Opinion received for corresponding Patent Cooperation Treaty Application No. PCT/FI2015/050371, dated Aug. 27, 2015, 9 pages.

(Continued)

*Primary Examiner* — Jeffrey A Gaffin
*Assistant Examiner* — Ayesha Huertas Torres
(74) *Attorney, Agent, or Firm* — Alston & Bird LLP

(57) ABSTRACT

Mechanisms are described for helping users manage their time and achieve predefined goals. One or more goals for a user may be received (e.g., from the user or some other source), and activities that the user performs over a period of time may be monitored, where the activities are informative regarding how the user is progressing towards the goal. A calendar entry may be determined based on the user's monitored activity, where the calendar entry is designed to help the user move closer to his goal. The calendar entry may be accepted or rejected by the user, and if accepted may be added to the user's calendar. In this way, the user's time may be optimized, and the user may be able to take defined steps towards his goal by taking the actions suggested.

14 Claims, 7 Drawing Sheets

(56) References Cited

U.S. PATENT DOCUMENTS

2013/0106603 A1* 5/2013 Weast .................... G06F 1/163
                                                            340/539.11
2013/0216989 A1   8/2013 Cuthbert
2014/0067455 A1   3/2014 Zhang et al.

OTHER PUBLICATIONS

"OptimizeMe Wants to Be Your Only Life Logging App", iDownloadBlog, Retrieved on Aug. 5, 2014, Webpage available at : http://www.idownloadblog.com/2014/01/22/optimizeme-app/.
"Time Tracking App Chronos Shows You How You Spend Your Days—and How Your Friends Do, Too", Techcrunch, Retrieved on Aug. 5, 2014, Webpage available at : http://techcrunch.com/2012/09/11/time-tracking-app-chronos-shows-you-how-you-spend-your-days-and-how-your-friends-do-too/.
Office Action for Japanese Patent Application No. 2017-500977 dated Mar. 6, 2018, with English translation, 4 pages.
Office Action for European Patent Application No. 15 730 820.6 dated Dec. 19, 2017, 8 pages.

\* cited by examiner

APPARATUS, METHOD, AND COMPUTER PROGRAM PRODUCT FOR DETERMINING CALENDAR ENTRIES TO ADVANCE USER GOALS

TECHNOLOGICAL FIELD

Example embodiments of the present invention relate generally to mechanisms for helping a user achieve predefined goals via time management.

BACKGROUND

Proper time management is a challenge for most people. Whether student or employee, soccer mom or stay-at-home dad, nearly everyone has things they want to do and only a limited number of hours a day in which to do them. With the proliferation of user devices, many users rely on digital calendars to schedule certain types of appointments, such as meetings at work, doctors' appointments, and lunch dates. Many activities, however, are unscheduled. As a result, users may find themselves running out of time with respect to certain tasks they want to accomplish.

BRIEF SUMMARY OF EXAMPLE EMBODIMENTS

Accordingly, it may be desirable to provide tools that allow users to better manage their time and take affirmative steps towards meeting their goals. In this regard, an example embodiment of the invention described herein provides mechanisms for tracking a user's goals, monitoring the user's actions with respect to those goals, and providing suggested tasks to be entered on the user's calendar to help the user move closer towards his goals.

In some embodiments, an apparatus is provided that includes at least one processor and at least one memory including computer program code. The at least one memory and the computer program code may be configured to, with the at least one processor, cause the apparatus at least to receive a goal for a user; monitor at least one activity of the user relating to the goal; determine a calendar entry based on the at least one activity monitored, where the calendar entry is configured to advance the user towards the goal; and cause presentation of the calendar entry to the user.

The at least one memory and the computer program code may be further configured to, with the at least one processor, cause the apparatus to determine whether the user is projected to meet the goal based on at least one of a previously-defined calendar entry on the user's calendar or the user's historical behavior. The at least one memory and the computer program code may be further configured to, with the at least one processor, cause the apparatus to determine the calendar entry only in an instance in which the user is projected to miss the goal.

In other cases, the at least one memory and the computer program code may be further configured to, with the at least one processor, cause the apparatus to receive an input from the user accepting the calendar entry presented and to add the calendar entry to the user's calendar in response to receiving the input. The at least one memory and the computer program code may be further configured to, with the at least one processor, cause the apparatus to automatically add the calendar entry to the user's calendar.

In still other cases, the at least one memory and the computer program code may be further configured to, with the at least one processor, cause the apparatus to: receive a plurality of goals of the user; determine a calendar entry for at least some of the goals; and prioritize the calendar entries for presentation to the user. The goal may comprise, for example, at least one of an activity, a temporal criterion, or an amount criterion.

In other embodiments, a method and computer program product are provided that receive a goal for a user, monitor at least one activity of the user relating to the goal; determine a calendar entry based on the at least one activity monitored, where the calendar entry is configured to advance the user towards the goal; and cause presentation of the calendar entry to the user.

In some cases, the method and computer program product may include determining whether the user is projected to meet the goal based on at least one of a previously-defined calendar entry on the user's calendar or the user's historical behavior. The calendar entry may be determined only in an instance in which the user is projected to miss the goal. The method and computer program product may further include receiving an input from the user accepting the calendar entry presented and adding the calendar entry to the user's calendar in response to receiving the input. In some cases, an input may be received from the user accepting the calendar entry presented, and the calendar entry may be added to the user's calendar in response to receiving the input. The calendar entry may be automatically added to the user's calendar in some cases.

In still other embodiments, a computer program product is provided that includes at least one non-transitory computer-readable storage medium having computer-executable program code portions stored therein. The computer-executable program code portions may comprise program code instructions for receiving a plurality of goals of the user; determining a calendar entry for at least some of the goals; and prioritizing the calendar entries for presentation to the user.

In still other embodiments, an apparatus is provided for determining calendar entries to advance user goals. The apparatus may include means for receiving a goal for a user; means for monitoring at least one activity of the user relating to the goal; means for determining a calendar entry based on the at least one activity monitored, where the calendar entry is configured to advance the user towards the goal; and means for causing presentation of the calendar entry to the user.

BRIEF DESCRIPTION OF THE SEVERAL VIEWS OF THE DRAWINGS

Figure 1:
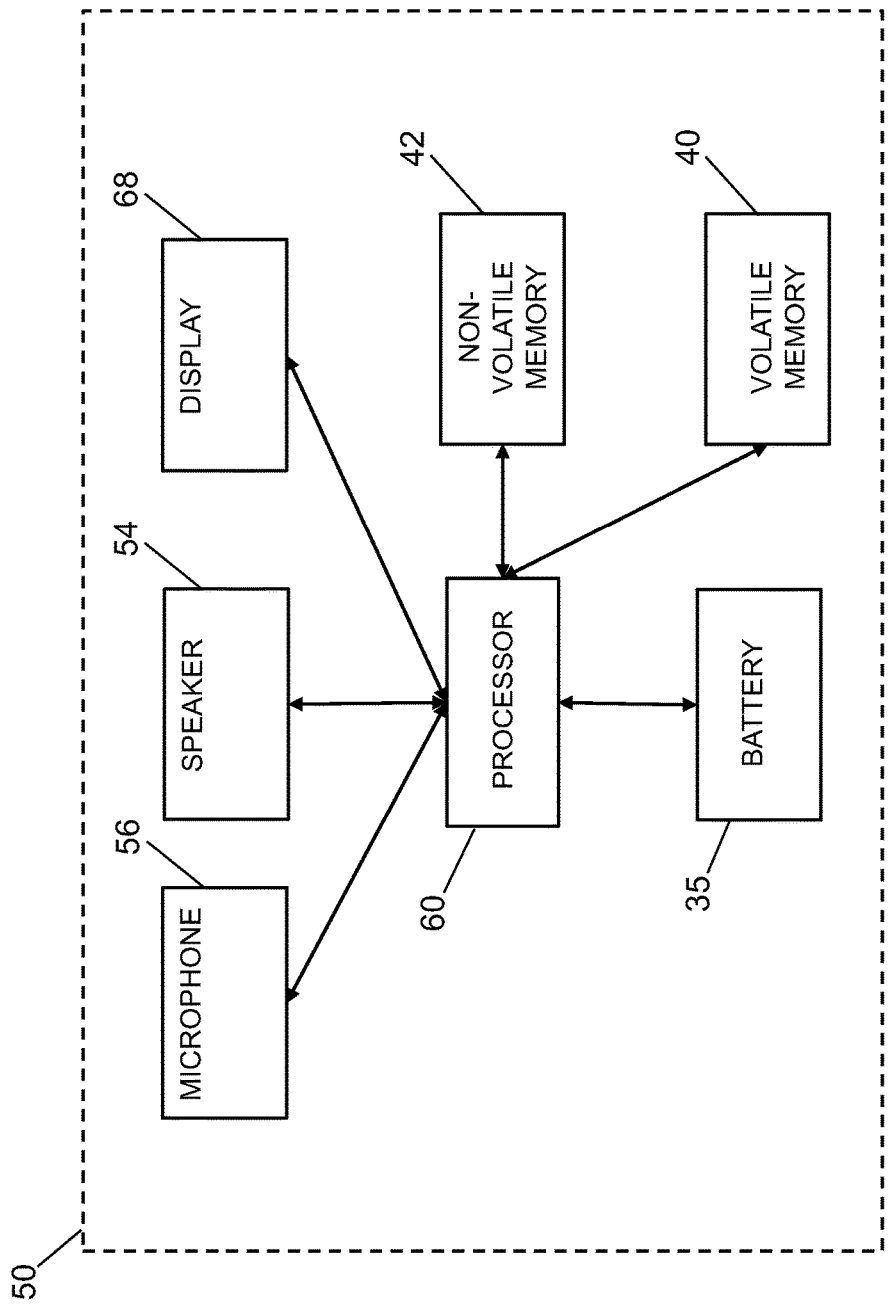
Figure 2:
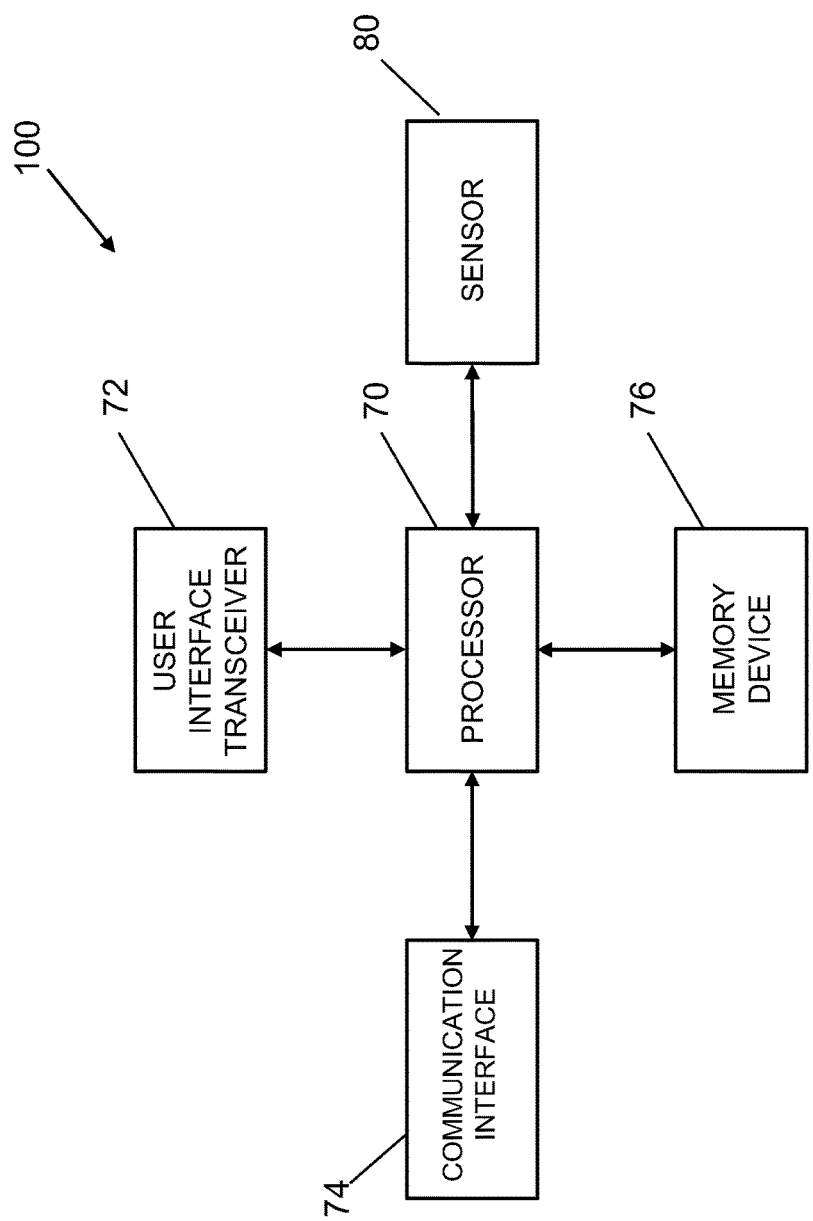
Figure 3:
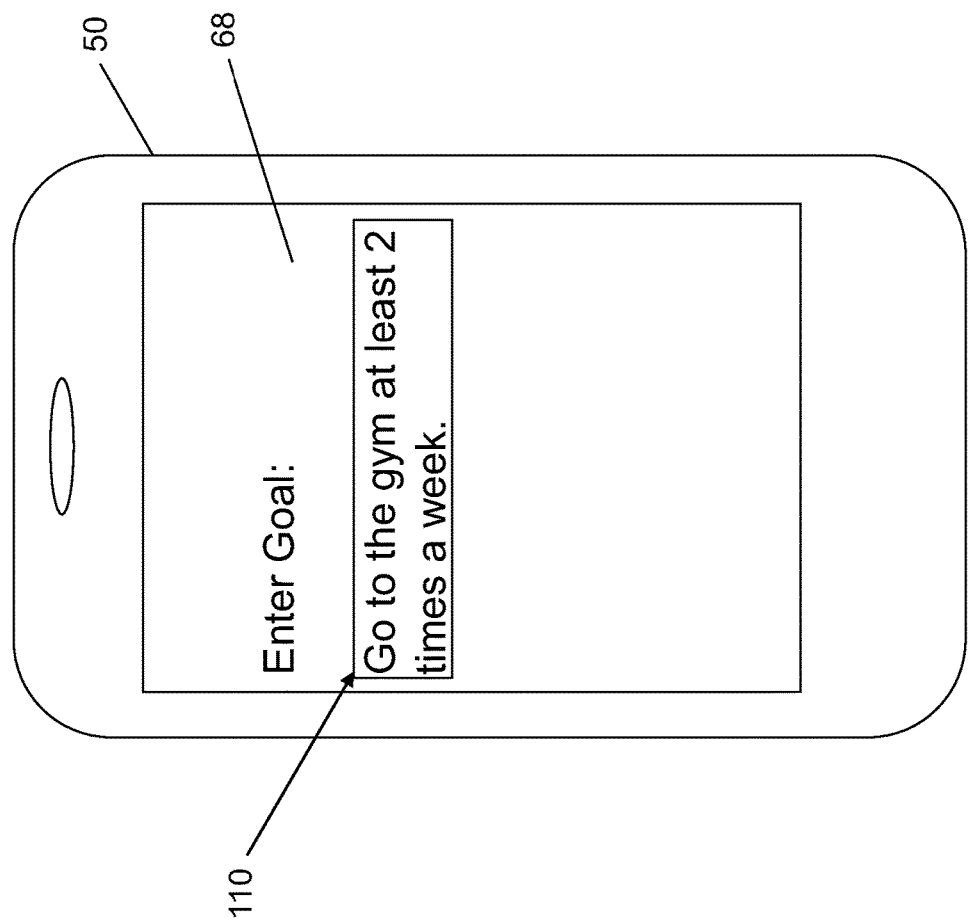
Figure 4:
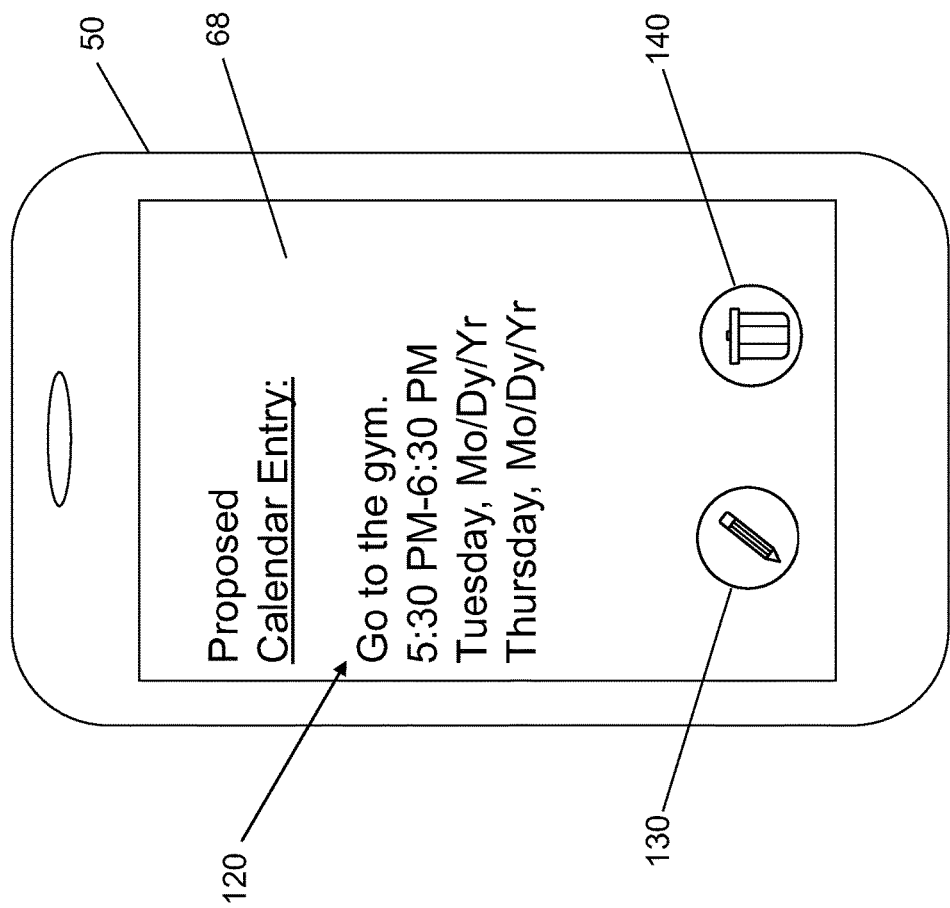
Figure 5:
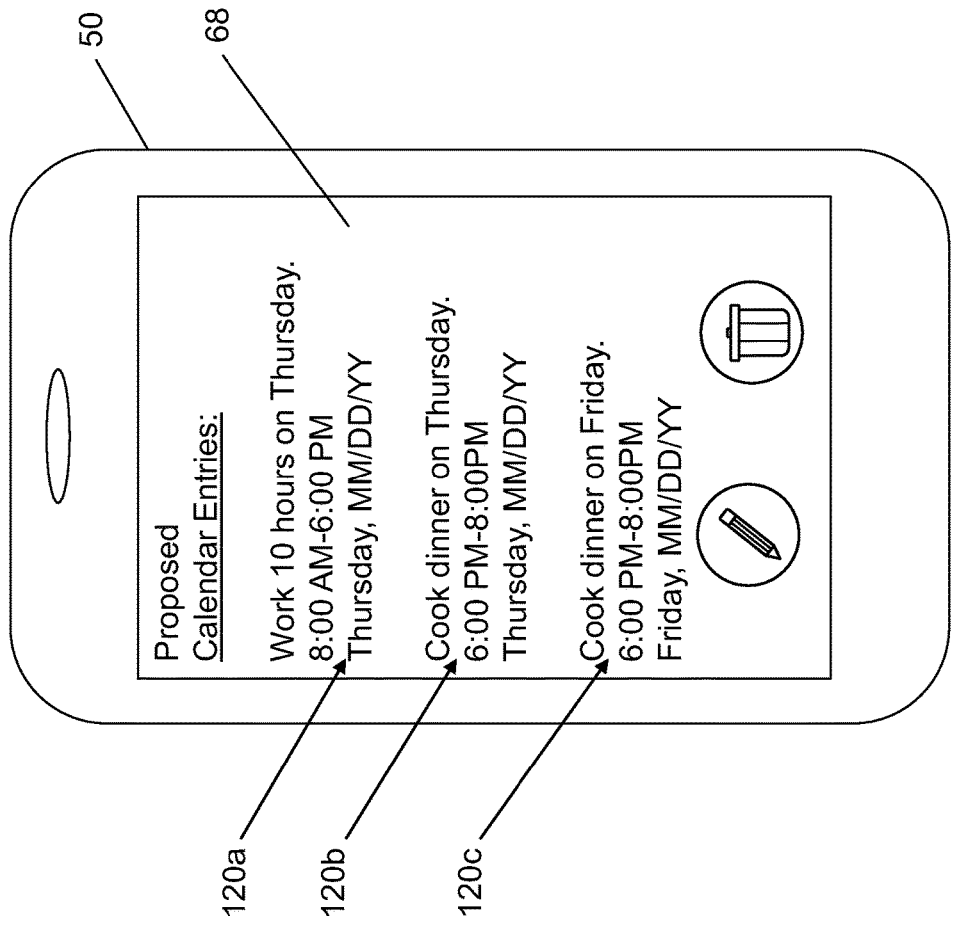
Figure 6A:
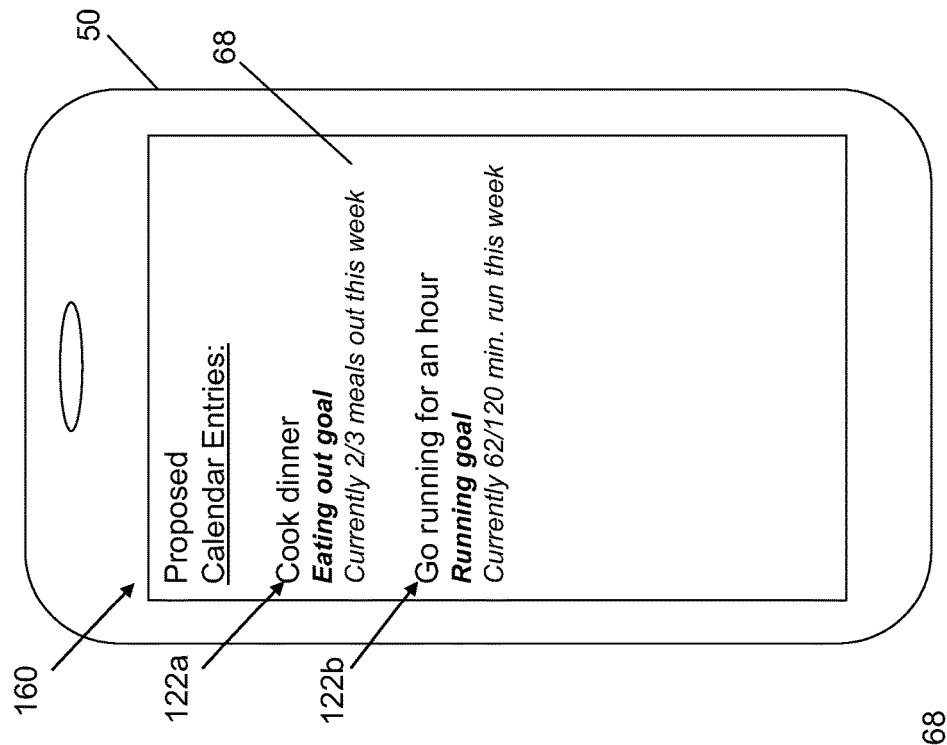
Figure 6B:
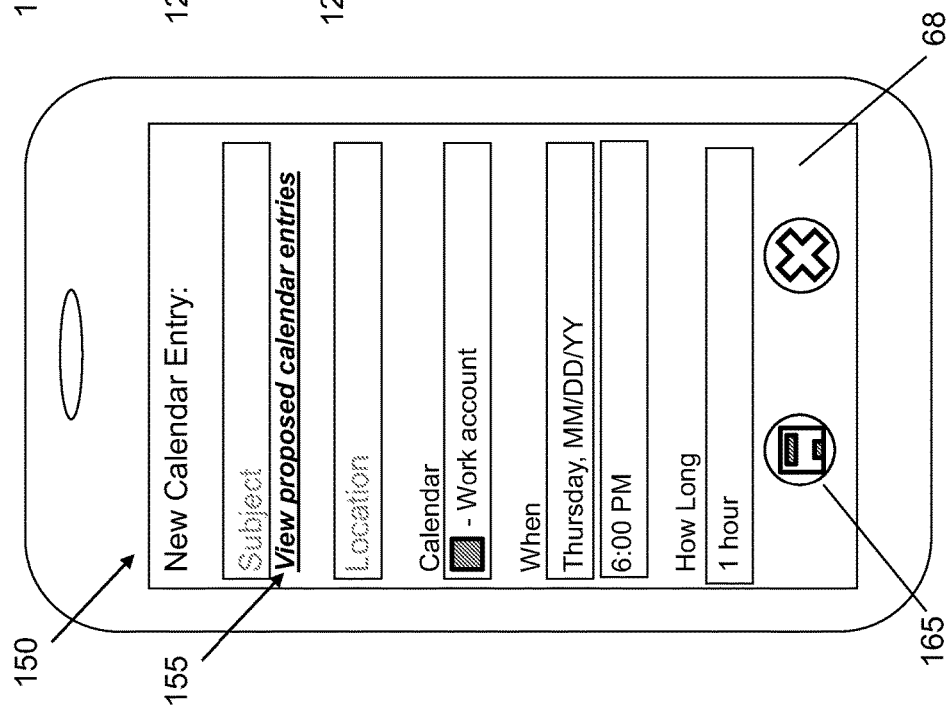
Figure 7:
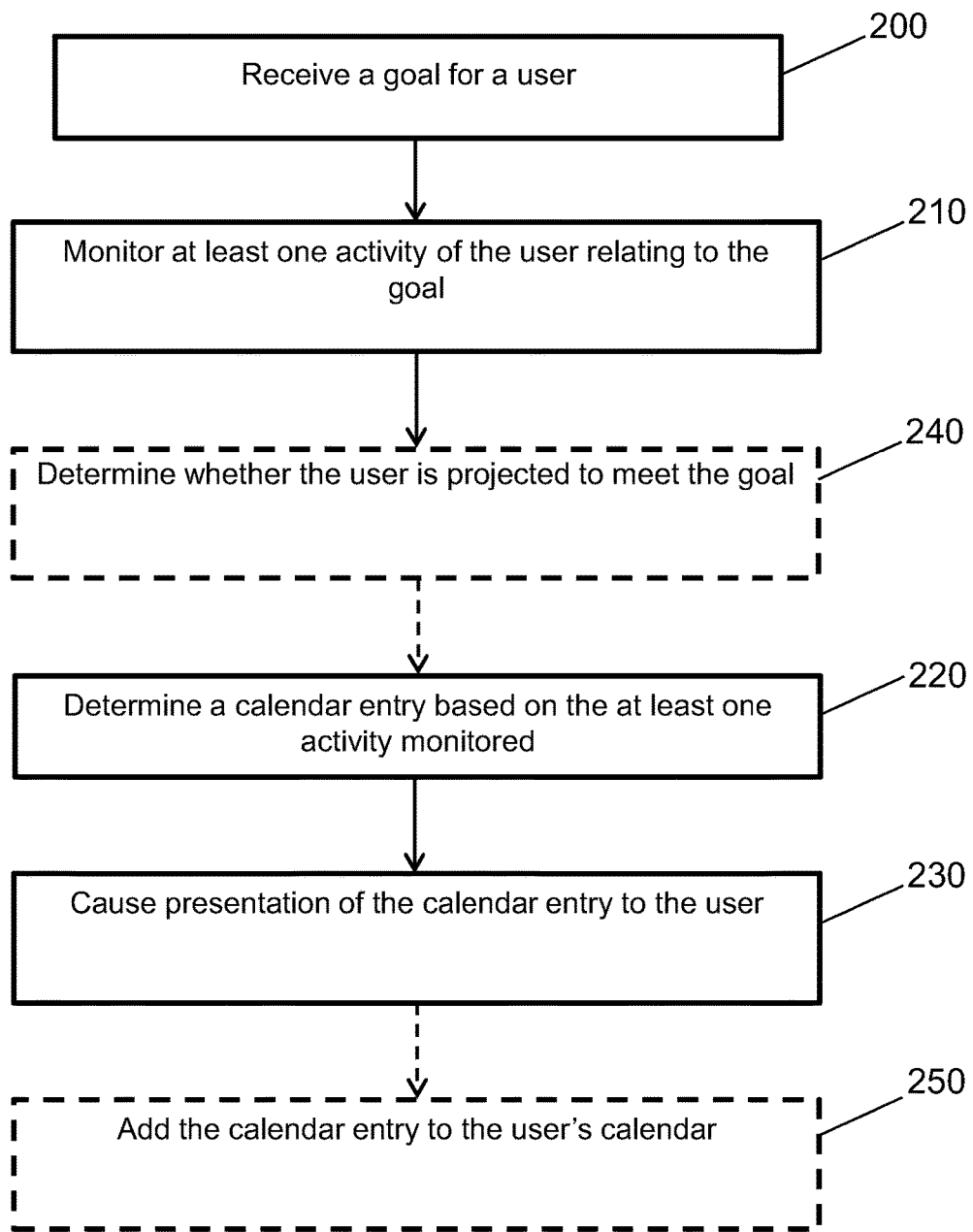

Having thus described example embodiments of the invention in general terms, reference will now be made to the accompanying drawings, which are not necessarily drawn to scale, and wherein:

FIG. 1 illustrates a schematic block diagram of a user device for determining calendar entries for advancing a user towards a goal according to an example embodiment of the present invention;

FIG. 2 illustrates a schematic block diagram of an apparatus for determining calendar entries for advancing a user towards a goal according to an example embodiment of the present invention;

FIG. 3 illustrates a user device presenting a user interface on its display for entering a goal according to an example embodiment of the present invention;

FIG. 4 illustrates a user device presenting on its display a calendar entry that is determined according to an example embodiment of the present invention;

FIG. 5 illustrates a user device presenting on its display a list of prioritized calendar entries according to an example embodiment of the present invention;

FIG. 6A illustrates a user device presenting on its display a user interface for receiving input from a user regarding a new calendar entry according to an example embodiment of the present invention;

FIG. 6B illustrates the user device of FIG. 6A presenting on its display a user interface providing a list of prioritized calendar entries for selection by the user for populating the new calendar entry according to an example embodiment of the present invention; and FIG. 7 illustrates a flowchart of methods of determining a calendar entry for advancing a user towards a goal according to an example embodiment of the present invention.

DETAILED DESCRIPTION

Some example embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

Almost everyone has too much to do and too little time. Many tasks that a user may want to accomplish are dictated by external factors, such as work, home life, social obligations, etc. Some such tasks, which may be difficult for the user to spontaneously remember otherwise, may be entered by the user on a calendar application running on the user's mobile device, such as on the user's smartphone or personal digital assistant (PDA). Using his calendar application, the user may thus have a good idea for when scheduled appointments are to take place and when the user may have "free time."

Other things that the user may want to do, however, may be considered more aspirational, more fluid, and less concrete. For example, the user may have a goal of eating out no more than three times a week or spending time walking half an hour each weekday. These types of goals, which may not necessarily have a fixed action and/or a specific date or time of day for the action to take place, may be less amenable to scheduling on a calendar. In other words, for example, the user may not be as concerned with when he takes his half-hour walk as he is with making sure he walks for half an hour at some point during the day. Thus, rather than scheduling a half-hour block of time on his calendar, the user may prefer to see when a good time each day would be to take that walk based on what else is going on (e.g., walking as a break after completing a big project during the work day on one day, but walking after work with a neighbor on another day).

Moreover, users may have routines including activities that a user may not want to enter on a calendar for fear of cluttering up the calendar or precluding other appointments from being scheduled. For example, a user may like to walk to a favorite lunch spot on Fridays, but may not necessarily schedule this activity on her calendar.

For longer term goals, such as spending no more than a certain number of hours a week at work, going to the gym at least twice a week, running at least 10 miles a month, or visiting family once a month, it may be difficult for the user to keep track of what those goals are and whether he is on track for meeting those goals. Such goals may generally need to be measured manually and explicitly, and the user may need to strategically plan how to achieve those goals given all of the other "scheduled" activities the user may have. Depending on what else is going on in the user's life (e.g., big projects at work, a crisis at home, a particular month filled with an inordinate number of social obligations), the user may lose sight of a particular goal or may lose track of what steps he has taken so far to advance towards the goal. Did the user run half a mile yesterday, or was that the day before? Should the user stay at work 9 hours today to finish a project, or would that take her over her goal of working fewer than 40 hours for that week?

Accordingly, embodiments of the invention described herein provide mechanisms for receiving a goal for a user (e.g., from the user or some other source), monitoring the user's progress towards the goal, and determining a calendar entry based on the user's progress and/or other considerations that can help the user move closer towards his goal. In this way, the user's time may be optimized, and the user may be able to take defined steps towards his goal by taking actions suggested by embodiments of the invention that fit in with other events and activities that are going on in the user's life.

Turning now to FIG. 1, a block diagram of a user device 50 that would benefit from embodiments of the present invention is illustrated. It should be understood, however, that the user device 50 as illustrated and hereinafter described is merely illustrative of one type of device that may benefit from embodiments of the present invention and, therefore, should not be taken to limit the scope of embodiments of the present invention. For example, in some embodiments the user device 50 may be a personal digital assistant (PDA), smartphone, pager, mobile television, gaming device, laptop computer, tablet computer, touch surface, wearable device, or any combination of the aforementioned, and other types of voice and text communications systems. Moreover, in still other embodiments, the user device 50 may be a fixed device, such as a personal computer.

Referring again to FIG. 1, the user device 50 may include a processor 60 or other processing device, which controls the functions of one or more components of the user device 50. In some embodiments, the processor 60 may include circuitry desirable for implementing audio and logic functions of the user device 50. For example, the processor 60 may be comprised of a digital signal processor device, a microprocessor device, and various analog to digital converters, digital to analog converters, and other support circuits. Control and signal processing functions of the user device 50 are allocated between these devices according to their respective capabilities. The processor 60 may include functionality to operate one or more software programs, which may be stored in memory.

The user device 50 may also comprise a user interface including an output device such as a conventional earphone or speaker 54, a microphone 56, a display 68, and a user input interface, all of which are coupled to the processor 60. The user input interface, which allows the user device 50 to receive data, may include any of a number of devices allowing the user device 50 to receive data, such as a keypad, a touch screen display (display 68 providing an example of such a touch screen display), or other input device. In embodiments including a keypad, the keypad may include the conventional numeric (0-9) and related keys (#, *), and other hard and soft keys used for operating the user device 50. Alternatively or additionally, the keypad may include a conventional QWERTY keypad arrangement. The keypad may also include various soft keys with associated functions. In addition, or alternatively, the user device 50 may include an interface device such as a joystick or other user input interface. The user device 50 may further include a battery 35, such as a vibrating battery pack, for powering various circuits that are required to operate the user device 50.

The user device 50 may further include volatile memory 40, such as volatile Random Access Memory (RAM) including a cache area for the temporary storage of data. The user device 50 may also include other non-volatile memory 42, which may be embedded and/or may be removable. The memories may store any of a number of pieces of information, and data, used by the user device 50 to implement the functions of the user device 50. For example, one or both memories 40, 42 may be configured to store all or portions of one or more computer applications, such as a calendar application, described in greater detail below.

It should also be noted that while FIG. 1 illustrates one example of a configuration of a user device 50 configured to determine calendar entries for advancing user goals, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

With reference to FIG. 2, an apparatus 100 for determining calendar entries is shown. The apparatus 100 may, in some embodiments, be embodied by the user device 50 of FIG. 1. The apparatus 100 may include or otherwise be in communication with a processor 70 (such as the processor 60 of the user device 50 of FIG. 1), a user interface transceiver 72, a communication interface 74, a memory device 76, and one or more sensors 80. In some embodiments, the processor 70 (and/or co-processors or any other processing circuitry assisting or otherwise associated with the processor 70) may be in communication with the memory device 76 via a bus for passing information among components of the apparatus 100. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70, including computer program applications such as calendar applications according to embodiments of the invention described herein and/or provided by the user.

The apparatus 100 may, in some embodiments, be a user device 50 (such as the user device of FIG. 1) or a fixed communication device or computing device configured to employ an example embodiment of the present invention. However, in some embodiments, the apparatus 100 may be embodied as a chip or chip set. In other words, the apparatus 100 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 100 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard-coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions (such as a calendar application), the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 100. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface transceiver 72 may be in communication with the processor 70 to receive an indication of a user input and/or to cause provision of an audible, visual, mechanical or other output to the user. As such, the user interface transceiver 72 may include, for example, a keyboard, a mouse, a joystick, a display, a touch screen(s), touch areas, soft keys, a microphone, a speaker, or other input/output mechanisms. For example, the user interface transceiver 72 may include or be in communication with a touch screen display (such as the touch screen display 68 of FIG. 1) that is configured to present images, such as images associated with a calendar application. In different example cases, the touch screen display 68 may be a two dimensional (2D) or three dimensional (3D) display. The touch screen display 68 may be embodied as any known touch screen display. Thus, for example, the touch screen display 68 could be configured to enable touch recognition by any suitable technique, such as resistive, capacitive, infrared, strain gauge, surface wave, optical imaging, dispersive signal technology, acoustic pulse recognition, and/or other techniques. The user interface transceiver 72 may be in communication with the touch screen display 68 to receive indications of user inputs at the touch screen display 68 and to modify a response to such indications based on corresponding user actions that may be inferred or otherwise determined responsive to the indications.

In this regard, various indications of user input may be received as a result of touch or proximity events at the touch screen display 68. For example, with respect to a touch event, a force indication may be received, which is indicative of the amount of force applied due to contact with the touch screen display 68. Alternatively or additionally, a position indication may be received (e.g., x-, y-coordinates) that describes the location of the contact. As another example, a proximity indication may be received in some cases that is indicative of the proximity of an object (such as the user's finger or some other object) to the touch screen display 68. For example, in some embodiments described herein, the user may be presented with a suggested calendar entry and may indicate acceptance or rejection of the calendar entry by selecting the corresponding user interface element on the touch screen display 68 with his finger or some other object.

Alternatively or additionally, the processor 70 may comprise user interface circuitry configured to control at least some functions of one or more user interface elements such as, for example, a speaker, microphone, display, and/or the like. The processor 70 and/or user interface circuitry comprising the processor 70 may be configured to control one or more functions of one or more user interface elements through computer program instructions (e.g., software and/or firmware) stored on a memory accessible to the processor 70 (e.g., memory device 76, and/or the like).

In some cases, the apparatus 100 may further include or be in communication with one or more sensors 80 or other components configured to detect or receive information. The sensor 80, which may be built into the user device 50 of FIG. 1 or may be embodied by a separate device (e.g., a separate device wearable by the user and/or with which the user interacts that can communicate sensed data to the apparatus 100), may be used to gather data regarding an activity undertaken by the user. For example, the sensor 80 may, in some cases, be a motion sensor that is configured to detect the user's physical activity, such as a pedometer or other motion sensor that can measure how many steps the user has taken and/or the distance covered by the user over a certain amount of time; a sleep detector that can be used to measure the electrical signals produced in the user's brain to determine how long the user sleeps; a temperature sensor (e.g., to detect when and for how long the user is outside); a location sensor (e.g., a global positioning device (GPS) to detect where the user is); etc. As additional examples, the sensor 80 may comprise or be embodied by indoor positioning devices and systems, such as those that incorporate WiFi, Bluetooth®, or infrared technologies; a microphone configured to capture ambient audio, which may then be analyzed to derive data regarding the activities of the user; a camera configured to capture images and/or video of the activities of the user; etc. Moreover, social networking and/or television or other internet-enabled device usage may be tracked, analyzed, etc. to determine, for example, the number of hours the user spent performing a certain activity (e.g., watching a certain television program, using Facebook® social networking), and the like.

Embodiments of the invention will now be described with reference to the figures. With reference to FIG. 3, a user device 50, such as the user device 50 shown in FIG. 1, that includes or otherwise embodies the apparatus 100 of FIG. 2 may be provided that is configured to provide various functions to the user, such as by running different applications (e.g., a calendar application, a messaging application, a tip calculator, etc.). The user may interact with the various applications via the display 68, such as by viewing text and images presented on the display and manipulating content by applying touch inputs via the display.

In this regard, and as described above, the apparatus embodied or otherwise included in the device 50 may include at least one processor (e.g., the processor 70 of FIG. 2) and at least one memory including computer program code (e.g., the memory 76 of FIG. 2), where the at least one memory and the computer program code is configured to, with the at least one processor, cause the apparatus at least to receive a goal for the user. Inputs describing the goal may be received directly from the user, such as by receiving the user's input via the display 68, as shown in FIG. 3, or in other cases the goal may be provided by a remote source and received by the user device 50 (e.g., via the communication interface 74). In some cases, for example, the goals may be saved to and/or received from a cloud service.

For example, the goal may be set by the user's employee (e.g., "work at least 2000 hours a year"), the user's friend (e.g., "get together for dinner at least once a month"), the user's spouse (e.g., "stay late at work at most two nights a week"), the user's personal trainer (e.g., "run at least 10 miles per month"), the user's doctor (e.g., "sleep at least an average of 7 hours each night), and so on. These other sources for goals may enter their goals using their own devices, in some embodiments, and may transmit their goals to the user device 50 (e.g., by sending an email or text message, etc.). Accordingly, the types of goals received for the user may vary. In some embodiments, a goal may include at least one of an activity (e.g., "sleep"), a temporal criterion or timeframe over which the goal is to be measured (e.g., "each night"), and/or an amount criterion ("an average of 7 hours").

In this regard, the goal may be set up as an "at least" goal, where the user or other source of the goal sets a minimum amount of the activity for a particular timeframe (e.g., per day, per week, per month, per year, etc.). Alternatively, the goal may be set up as an "at most" goal, where the user or other source of the goal sets a maximum amount of the activity to be performed for a particular timeframe. In a case where the goal is an "at least" goal, such as for the goal "get together for dinner at least once a month," the apparatus may be caused to determine a calendar entry to schedule performance of the activity by the user, as described below. Thus, in this example, the calendar entry may schedule a dinner with the respective party during the last week of the month on a night that appears to be clear of other appointments. In a case where the goal is an "at most" goal, such as for the goal "stay late at work at most two nights a week," the apparatus may be caused to determine a calendar entry that will mark time on the user's calendar as "busy," such that the user will not schedule late meetings and/or will be reminded to go home at a certain time.

In some embodiments, the at least one memory and the computer program code may be configured to, with the at least one processor, cause the apparatus to monitor at least one activity of the user relating to the goal. The activity that is monitored may be directly related to the goal (e.g., a sensor 80 of FIG. 2 may be a sleep sensor that is configured to measure how many hours per night the user sleeps with respect to a goal of sleeping at least 7 hours per night), or the activity monitored may be indirectly related to the goal. For example, a goal of eating out no more than 3 times a week may be affected by how long the user stays at work each day, as the user may be more inclined to get take-out from a restaurant on the way home from work on days he leaves work late. In this example, the sensor 80 of FIG. 2 may be a GPS device and/or timekeeping device that knows when the user is at his office and when the user has left to go home. In some cases, the activity or activities may be monitored by a separate device, as described above, which may communicate updates regarding the activity monitored to the apparatus (e.g., either directly or via a cloud service).

The at least one memory and the computer program code may thus be configured to, with the at least one processor, cause the apparatus to determine a calendar entry based on the at least one activity that is monitored and to cause presentation of the calendar entry to the user. In this regard, the calendar entry may be configured to advance the user towards the goal. When a cloud service is used, for example, the cloud may determine the calendar entry and may then send instructions to the device associated with the apparatus to present the calendar entry. In other cases, however, the device associated with the apparatus may itself determine and present the calendar entry.

With reference to FIG. 4, for example, in order to advance the user towards a goal of going to the gym at least twice a week, the apparatus may be caused to determine a calendar entry 120 of "Go to the gym" that starts at 5:30 PM (e.g., the time the user generally leaves work) and extends to 6:30 PM for two days out of the week, such as Tuesday and Thursday, when the user has no other evening appointments scheduled. In a case in which the monitored activity indicates that the user has already accomplished part of his goal, such as (in the above example) where the user has already run for an hour, the calendar entry may be determined based on the activity monitored, such that only one more hour of running is proposed to the user via the calendar entry (e.g., 5:30 PM to 6:30 PM on Thursday only).

In some embodiments, the at least one memory and the computer program code may be configured to, with the at least one processor, cause the apparatus to receive an input from the user accepting the calendar entry presented and to add the calendar entry to the user's calendar in response to receiving the input. For example, in FIG. 4, a button 130 may be presented on the display (e.g., in the form of a pencil icon), and a user's selection of the button may provide the input indicating the user's acceptance of the proposed calendar entry 120. Thus, in the depicted example, the user's selection of the acceptance button 130 (e.g., via a touch input applied to the button) may result in the displayed calendar entry 120 being added as a scheduled appointment to the user's calendar. Conversely, the user may not wish to add the proposed calendar entry 120 to his calendar (e.g., because the user wants to keep that timeslot in his calendar clear in the event one of his friends tries to schedule a dinner) and may thus reject the proposed calendar entry. In this case, the user may select another button 140 (e.g., in the form of a wastebasket), and as a result the proposed calendar entry 120 may be deleted. In some embodiments, if the user rejects or declines a proposed calendar entry 120, no further calendar entries pertaining to the same goal would be given in the current timeframe (e.g., in that week, if the goal is measured on a weekly basis). The proposal of new calendar entries may, however, begin again during the following timeframe (e.g., the following week).

In other embodiments, however, the at least one memory and the computer program code may be configured to, with the at least one processor, cause the apparatus to automatically add the calendar entry 120 to the user's calendar, such as without any input from the user accepting the proposed calendar entry. For example, the user may designate a certain goal or goals as high priority (e.g., when the goal is first defined by the user or received from a third party source, or anytime thereafter), and as a result any proposed calendar entries pertaining to that goal may automatically be entered on the user's calendar. Accordingly, in such embodiments, presentation of the calendar entry to the user may be done via the user's calendar application (e.g., displaying the calendar entry as part of the calendar), rather than via the separate user interface that provides the proposed calendar entry 120 shown in FIG. 4.

Although in some cases the calendar entry may be determined and presented to the user regardless of the user's performance in moving towards the goal, in other cases the at least one memory and the computer program code may be configured to, with the at least one processor, cause the apparatus to determine the calendar entry only in an instance in which the user is projected to miss the goal. Thus, if the user appears to be on track to meet a particular goal, the user may be left alone, and no calendar entries may be proposed. If, however, the user appears to be in danger of missing the goal, one or more calendar entries may be determined and/or presented to the user for consideration and/or addition to the user's calendar.

Accordingly, the at least one memory and the computer program code may be configured to, with the at least one processor, cause the apparatus to determine whether the user is projected to meet the goal, or whether the user is projected to miss the goal. In this regard, the apparatus may be configured to ascertain whether the user is on track to meet the goal in various ways. In some cases, for example, the at least one memory and the computer program code may be configured to, with the at least one processor, cause the apparatus to determine whether the user is projected to meet the goal based on at least one of a previously-defined calendar entry on the user's calendar or the user's historical behavior.

In this regard, the at least one memory and the computer program code may be configured to, with the at least one processor, cause the apparatus to project whether the user will meet or miss his goal with reference to the user's calendar and the pre-defined calendar entries already in his calendar. For example, appointments that are already scheduled on the user's calendar (e.g., certain people or places designated in the appointments) may be associated with certain activities, and thus knowing that a certain appointment is scheduled to take place may result in an expectation that the associated activity will also take place. If, for example, the user's calendar includes an appointment to meet a friend at the gym, and the gym is associated with half an hour or more of running, then the apparatus may be caused to presume that the user will run for at least half an hour as a result of that appointment. As another example, if the user's goal is to eat out at most 3 times during the week, and the user has a scheduled appointment on his calendar to meet a friend after work, where the friend is associated with eating dinner at a restaurant (e.g., based on the user's past behavior), then the apparatus may be caused to presume that the user will eat out on the day that appointment is scheduled and may factor this into whether the user is projected to miss his stated goal of eating out no more than 3 times that week.

In addition or alternatively to associating people and/or places in appointments already scheduled on the user's calendar with the activities that the user is expected to do, the presence of certain previously-defined calendar entries on the user's calendar may further provide an indication of whether the user will have time to do a certain activity that the apparatus may otherwise expect him to do. For example, although the user may generally run on Thursday afternoons for an hour, a business trip appearing as a previously-defined calendar entry on the user's calendar may cause the apparatus to project that the user will not be able to run for an hour that Thursday, which may cause the user to miss his goal of running for two hours that week.

Additionally or alternatively, the at least one memory and the computer program code may be configured to, with the at least one processor, cause the apparatus to detect patterns in the user's historical behavior. For example, if over the past three months the user has consistently been running for one hour on Thursday afternoons, the apparatus may be caused to, via the processor, presume that the user will run for an hour the following Thursday. Thus, if the user's goal is to run for two hours each week, and the apparatus has data indicating that the user ran for an hour on Monday night (e.g., data from a sensor), then the apparatus may be caused to project that the user will meet his goal of running two hours that week because the user is expected to run for an hour on Thursday night, and no calendar entries for that goal would be determined or presented in some embodiments. If, however, on Thursday evening there is no data to indicate that the user ran on Thursday afternoon, then the apparatus may be caused to determine, e.g., via the processor, a calendar entry for proposing to the user that the user schedule an hour on Saturday morning to run to meet the goal of running two hours that week. In some cases, the prediction of a user's behavior may involve a number of factors (e.g., in addition to the day of the week in the example described above). For instance, in the previous example, the detected pattern of the user going for a run every Thursday afternoon may coincide with other parameters, such as the user having no meetings scheduled after 3 PM on that day, the user being in the city that afternoon (e.g., as opposed to a satellite office in a different location or home), etc. All of these factors may be considered in determining whether the user is likely to meet his goal.

In some embodiments, the apparatus may be caused (e.g., via the processor) to determine the calendar entry based on the calendar entries already scheduled in the user's calendar, based on the user's preferences or routines as detected from past behavior, based on the particular activity or activities that are monitored relating to the particular goal, and/or a combination of these factors, among others. For example, in determining a calendar entry to propose to the user, other calendar entries already scheduled in the user's calendar may be taken into account to avoid suggesting a day or time for the proposed action that may be inconvenient to the user. Going back to the previous example of a goal of running two hours a week, where the user has already run for an hour that week, an additional hour of running time may be proposed for Friday at 5 PM, rather than Thursday at 5 PM, when it is identified that the user has several meetings scheduled between noon and 4:30 PM on Thursday and no meetings on Friday afternoon because it is expected that the user may be more tired after work on Thursday than Friday based on this schedule. Moreover, the user's calendar entries for the week as a whole may be considered, such that the proposed calendar entry that is determined does not result in the user having a number of scheduled calendar entries in one part of the week and no calendar entries in another part of the week (e.g., to balance the user's schedule).

Furthermore, as described above, in some embodiments, patterns in the user's behavior may be detected based on the user's historical behavior, and such patterns may inform the determination of the calendar entry. For example, based on data obtained via a GPS sensor, it may be identified that the user likes to work a long day on Thursdays. Accordingly, a proposed calendar entry may take this into account by scheduling the proposed activity for later on Thursday or for a different day, regardless of whether the user's calendar itself is clear on Thursday afternoon. As another example, and as described above, it may be determined that the user typically performs a certain activity on Saturday mornings (e.g., runs for 30 minutes). In this case, the determination of the calendar entry may take into account this future, yet to be performed activity, in proposing the activity to be undertaken by the user. Thus, in the running example, if the user has run for an hour already (e.g., as determined based on sensor data, for example) and is expected to run for another half hour on Saturday, a proposed calendar entry may be determined to suggest that the user run for an additional half hour to reach his goal of 2 hours, rather than for an additional hour.

Regardless of the factors that are considered in determining the calendar entry, the monitored activity or activities relating to the goal may form the backdrop for the determination of the calendar entry. For example, the monitoring of the activity or activities may provide data that is analyzed to identify patterns regarding the user's behavior and preferences; the monitoring of the activity or activities may further provide data that is analyzed to provide context to previously scheduled calendar entries (e.g., providing data regarding which activities are associated with which places and people appearing on the user's calendar, as described above). At a very basic level, the activity or activities that are monitored with respect to a particular goal may provide data that can be analyzed (e.g., via the processor) to determine how far the user has moved toward his goal and how much is left, which may or may not be included in a proposed calendar entry to the user as described above.

In still other embodiments, the at least one memory and the computer program code may be configured to, with the at least one processor, cause the apparatus to receive a plurality of goals for the user, determine calendar entries for at least some of the goals, and prioritize the calendar entries for presentation to the user. For example, in a situation in which several goals have been received for the user and the apparatus has been caused to determine a calendar entry for more than one of the goals, the apparatus may be caused (via the processor) to anticipate which goal the user is likely to expend more effort trying to achieve. In this way, the apparatus may be caused to determine that calendar entries proposed for one goal are more likely to be accepted by the user than calendar entries proposed for another goal and may cause the calendar entries to be prioritized such that those more likely to be accepted are presented to the user ahead of those that are less likely to be accepted.

For example, a user may have a goal of working at least 45 hours a week and may also have a goal of eating out at most 3 times a week. In accordance with some of the embodiments described above, the apparatus may be caused to determine a calendar entry for each of these goals. Thus, for example, one calendar entry that may be determined with respect to the working goal may be that the user should work 10 hours on Thursday. Another calendar entry that may be determined with respect to the eating out goal may be that the user should cook dinner on Thursday and Friday (e.g., if it is Wednesday evening, the user ate out on Sunday and Tuesday, and the user is expected to eat out on Saturday as well). The apparatus may, however, be caused to determine (e.g., via the processor) that the user places a higher value on meeting his goal of working 45 hours a week than on his goal of not eating out more than 3 times a week. This determination may be the result of a designation by the user of the working goal as being more important than the eating out goal (e.g., when the user first defined or received the goals), or the determination may be the result of a detected pattern in the user's behavior. For example, when presented with the same two calendar entries in the past, the user may have chosen to accept the calendar entry proposing that he work 10 hours on Thursday and to reject the calendar entry proposing that he cook dinner on Thursday and Friday. In either case, as a result of prioritizing the working goal over the eating out goal, the calendar entry for the working goal may be prioritized over the calendar entry for the eating out goal, and the presentation of the calendar entries may reflect this prioritization, as shown, for example, in FIG. 5. Accordingly, in FIG. 5, the calendar entry 120*a* for working 10 hours on Thursday is presented at the top of the list, followed by the calendar entries 120*b*, 120*c* for cooking dinner.

With reference to FIGS. 6A and 6B, in some embodiments, the user may be presented with one or more calendar entries that have been determined (e.g., based on the activity or activities monitored) for helping the user to advance toward the corresponding goal or goals in an instance in which the user enters the calendar application and starts to add a new calendar entry to a vacant timeslot on his calendar. In this case, a user interface 150 shown in FIG. 6A may be presented to the user on the display 68, via which the user may enter inputs regarding a new desired calendar entry.

In some embodiments, however, a user interface element 155 (e.g., such as a button or a link, as shown) may be presented on the user interface 150, the selection of which by the user may cause the presentation of one or more proposed calendar entries that have been determined by the apparatus (e.g., calendar entries that have neither been accepted nor rejected by the user yet), such as via a user interface 160 shown in FIG. 6B. In FIG. 6B, for example, two calendar entries relating to two of the user's goals are presented for the timeslot of interest to the user (e.g., 6:00 PM-7:00 PM as shown in FIG. 6A). In the depicted example, one calendar entry 122*a* is to "Cook dinner," relating to the user's goal of not eating out more than 3 times a week, and another calendar entry 122*b* is to "Go running for an hour," relating to the user's goal of running at least 2 hours every week.

As described above, in some embodiments, the calendar entries may be prioritized such that they are presented in an order that reflects the priority of the goals to the user. Thus, in FIG. 6B, the priority of the calendar entry 122*a* to "Cook dinner" may be prioritized higher than the calendar entry 122*b* to "Go running for an hour."

Regardless of the priority of the calendar entries 122*a*, 122*b* or their order of presentation, the user may select via the user interface of FIG. 6B one of the calendar entries for populating the new calendar entry displayed via the user interface 150 of FIG. 6A. For example, by selecting the first calendar entry 122*a* via the user interface 160 of FIG. 6B, the user may be returned to the user interface 150 of FIG. 6A, and the information for creating the new calendar entry based on the proposed calendar entry 122*a* may be automatically filled in (not shown). The user could, at that point, save the new calendar entry, such as by selecting a "save" button 165, and the new calendar entry (corresponding to the proposed calendar entry 122*a* of "Cook dinner" in this example) would be incorporated into the user's calendar.

As depicted in FIG. 6B, in some cases the proposed calendar entries may include information regarding the user's performance towards the goal so far, such that the user has an idea of how far he has left to go to achieve the goal for the current timeframe. With respect to the eating out goal in FIG. 6B, for example, the corresponding calendar entry 122*a* may include the description "Currently ⅔ meals out this week" to indicate that the user has already eaten out twice and has at most one more to go. With respect to the running goal in FIG. 6B, the corresponding calendar entry 122*b* may include the description "Currently 62/120 min. run this week" to indicate that the user has run for 62 minutes out of the two hours he set as a minimum goal to reach. In some cases, the information provided in the calendar entries regarding the goal status may be updated as additional data is received regarding the activity monitored and/or the user makes further progress towards meeting his goal.

FIG. 7 illustrates a flowchart of systems, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an example embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, one example embodiment of a method for determining calendar entries for advancing a user towards a goal is shown in FIG. 7. FIG. 7 depicts an example embodiment of the method that includes receiving a goal for a user at block 200, monitoring at least one activity of the user relating to the goal at block 210, and determining a calendar entry based on the at least one activity monitored at block 220. The calendar entry may be configured to advance the user towards the goal, as described in greater detail above. According to the method, the calendar entry may be caused to be presented to the user at block 230. The goal may comprise at least one of an activity, a temporal criterion (e.g., a timeframe), or an amount criterion.

In some cases, a determination may be made regarding whether the user is projected to meet the goal at block 240. The determination may be made for example based on a previously-defined calendar entry on the user's calendar and/or the user's historical behavior, as described above. In some embodiments, the calendar entry may be determined only in an instance in which the user is projected to miss the goal.

In some cases, the calendar entry may be added to the user's calendar at block 250. The calendar entry may be added to the user's calendar in response to receiving an input from the user accepting the calendar entry presented, or the calendar entry may be added to the user's calendar automatically, as described above.

In some embodiments, a plurality of goals for the user may be received, and a calendar entry may be determined for at least some of the goals. The calendar entries may be prioritized for presentation to the user, as described above.

In some embodiments, certain ones of the operations above may be modified or further amplified as described below. Furthermore, in some embodiments, additional optional operations may be included, some of which are shown in FIG. 7 using dashed lines. Although the operations above are shown in a certain order in FIG. 7, certain operations may be performed in any order. In addition, modifications, additions, or amplifications to the operations above may be performed in any order and in any combination.

In an example embodiment, an apparatus for performing the methods of FIG. 7 above may comprise a processor (e.g., the processor 70 of FIG. 2) configured to perform some or each of the operations (200-250) described above. The processor may, for example, be configured to perform the operations (200-250) by performing hardware implemented logical functions, executing stored instructions, or executing algorithms for performing each of the operations.

Alternatively, the apparatus may comprise means for performing each of the operations described above. In this regard, according to an example embodiment, examples of means for performing operation 200 may comprise, for example, the processor 70, the user interface transceiver 72, the communication interface 74, and/or a device or circuit for executing instructions or executing an algorithm for processing information as described above. Examples of means for performing operations 210 and 240 may comprise, for example, the processor 70, the communication interface 74, the memory device 76, the one or more sensors 80, and/or a device or circuit for executing instructions or executing an algorithm for processing information as described above. Examples of means for performing operations 220 and 250 may comprise, for example, the memory device 76, the processor 70, and/or a device or circuit for executing instructions or executing an algorithm for processing information as described above. Examples of means for performing operation 230 may comprise, for example, the memory device 76, the user interface transceiver 72, the processor 70, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. For example, as described above, in some cases, the apparatus may be associated with a single example, the apparatus described above may, in some cases, be embodied by a single device, such as a smart phone. The smart phone may thus be configured to receive a goal for a user, monitor at least one activity of the user relating to the goal, determine a calendar entry based on the at least one activity monitored, and present the calendar entry to the user. In other cases, however, the device associated with the apparatus (e.g., the smart phone) may be configured to communicate with various other devices via a cloud service. In this way, one or more separate devices may be used to track the user's activities, provide/receive the user's goals, generate and propose a calendar entry, and provide instructions to the device (e.g., the smart phone) for presenting the proposed calendar entry. For example, a user may use his home computer to input a goal to run for 3 hours a week; the goal may be provided to a cloud service; the user's Fitbit® device may track how much running the user does and provide this information to the cloud service; the cloud service may determine whether a calendar entry should be proposed; and the proposed calendar entry may be presented on the user's smart phone based on instructions sent from the cloud to the smart phone.

Therefore, it is to be understood that the inventions are not to be limited to the specific embodiments disclosed and that modifications and other embodiments are intended to be included within the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
at least one sensor configured to detect user activity;
at least one processor; and
at least one memory comprising computer program code, the at least one memory and the computer program code configured to, with the at least one processor, cause the apparatus at least to:
receive a goal for a user;
monitor, via the at least one sensor, at least one activity of the user relating to the goal, the at least one activity comprising data obtained via the at least one sensor;
determine whether the user is projected to meet the goal based on at least one of a previously-defined calendar entry on the user's calendar or the user's historical behavior;
analyze the data to determine progress towards the goal;
determine a calendar entry based on the analyzed data only in an instance in which the user is projected to miss the goal, wherein the calendar entry comprises at least one proposed performance of the at least one activity and is configured to advance the user towards the goal in view of the determined progress;
update the calendar entry based on additional data received regarding the at least one monitored activity of the user; and
cause presentation of the calendar entry to the user.

2. The apparatus according to claim 1, wherein the at least one memory and the computer program code are further configured to, with the at least one processor, cause the apparatus to receive an input from the user accepting the calendar entry presented and to add the calendar entry to the user's calendar in response to receiving the input.

3. The apparatus according to claim 1, wherein the at least one memory and the computer program code are further configured to, with the at least one processor, cause the apparatus to automatically add the calendar entry to the user's calendar.

4. The apparatus according to claim 1, wherein the at least one memory and the computer program code are further configured to, with the at least one processor, cause the apparatus to:
receive a plurality of goals of the user;
determine a calendar entry for at least some of the goals; and
prioritize the calendar entries for presentation to the user.

5. The apparatus according to claim 1, wherein the goal comprises at least one of an activity, a temporal criterion, or an amount criterion.

6. The apparatus according to claim 1, wherein the calendar entry comprises information regarding the user's performance towards the goal so far, the information being updated as the additional data is received regarding the monitored at least one activity of the user relating to the goal.

7. The apparatus according to claim 1, wherein the at least one memory and the computer program code are further configured to, with the at least one processor, cause the apparatus to determine whether the user is projected to meet the goal based on at least one of a yet to be performed activity to be undertaken by the user.

8. A computer-implemented method comprising:
receiving a goal for a user;
monitoring, via at least one sensor, at least one activity of the user relating to the goal, the at least one activity comprising data obtained via the at least one sensor;
determining whether the user is projected to meet the goal based on at least one of a previously-defined calendar entry on the user's calendar or the user's historical behavior;
analyzing the data to determine progress towards the goal;
determining, via a processor, a calendar entry based on the analyzed data only in an instance in which the user is projected to miss the goal, wherein the calendar entry comprises at least one proposed performance of the at least one activity and is configured to advance the user towards the goal in view of the determined progress;
updating the calendar entry based on additional data received regarding the at least one monitored activity of the user; and
causing presentation of the calendar entry to the user.

9. The method according to claim 8 further comprising receiving an input from the user accepting the calendar entry presented and adding the calendar entry to the user's calendar in response to receiving the input.

10. The method according to claim 8 further comprising:
receiving a plurality of goals of the user;
determining a calendar entry for at least some of the goals; and
prioritizing the calendar entries for presentation to the user.

11. A computer program product comprising at least one non-transitory computer-readable storage medium comprising computer-executable program code portions stored therein, the computer-executable program code portions comprising program code instructions for:
receiving a goal for a user;
monitoring, via at least one sensor, at least one activity of the user relating to the goal, the at least one activity comprising data obtained via the at least one sensor;

determining whether the user is projected to meet the goal based on at least one of a previously-defined calendar entry on the user's calendar or the user's historical behavior;

analyzing the data to determine progress towards the goal;

determining a calendar entry based on the analyzed data only in an instance in which the user is projected to miss the goal, wherein the calendar entry comprises at least one proposed performance of the at least one activity and is configured to advance the user towards the goal in view of the determined progress;

updating the calendar entry based on additional data received regarding the at least one monitored activity of the user; and causing presentation of the calendar entry to the user.

12. A computer program product according to claim 11, wherein the computer-executable program code portions further comprise program code instructions for receiving an input from the user accepting the calendar entry presented and adding the calendar entry to the user's calendar in response to receiving the input.

13. A computer program product according to claim 11, wherein the computer-executable program code portions further comprise program code instructions for automatically adding the calendar entry to the user's calendar.

14. A computer program product according to claim 11, wherein the computer-executable program code portions further comprise program code instructions for receiving a plurality of goals of the user; determining a calendar entry for at least some of the goals; and prioritizing the calendar entries for presentation to the user.

* * * * *